R. R. BOWERS.
DRAFT ATTACHMENT.
APPLICATION FILED SEPT. 27, 1920.
1,416,681.
Patented May 23, 1922.
2 SHEETS—SHEET 1.
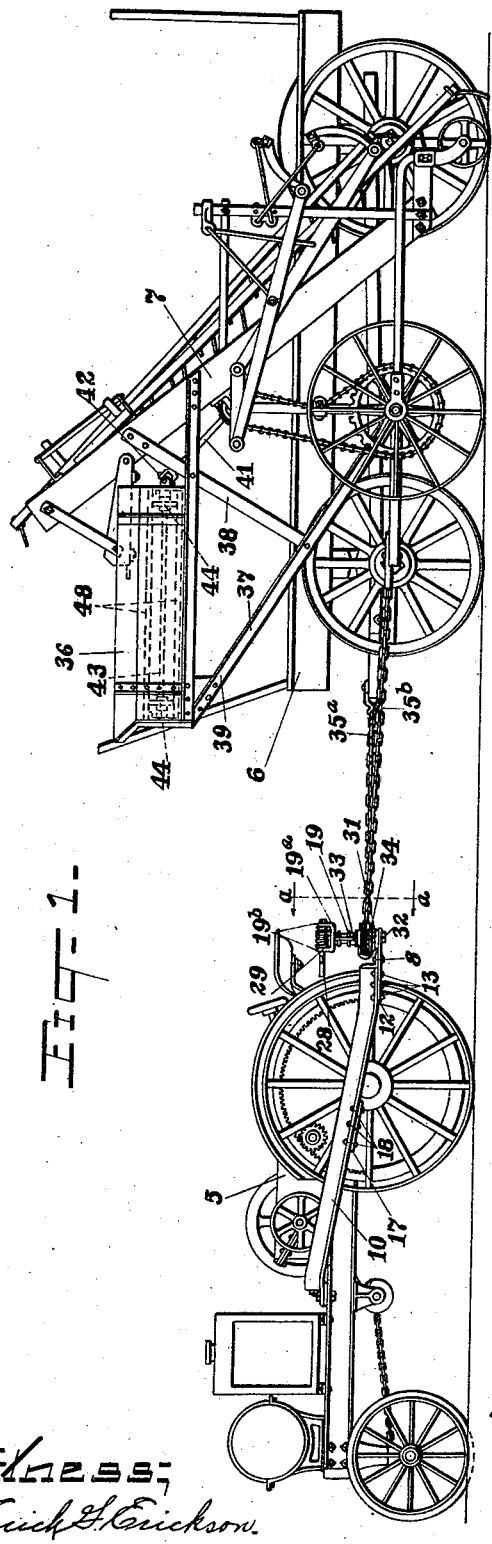
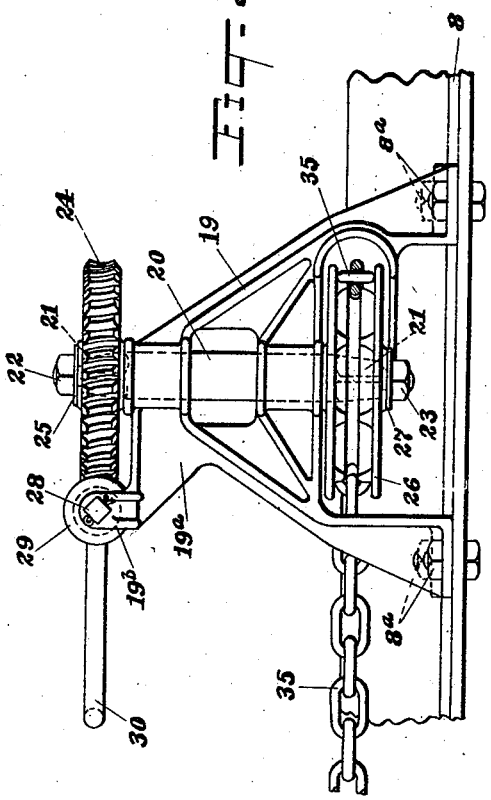

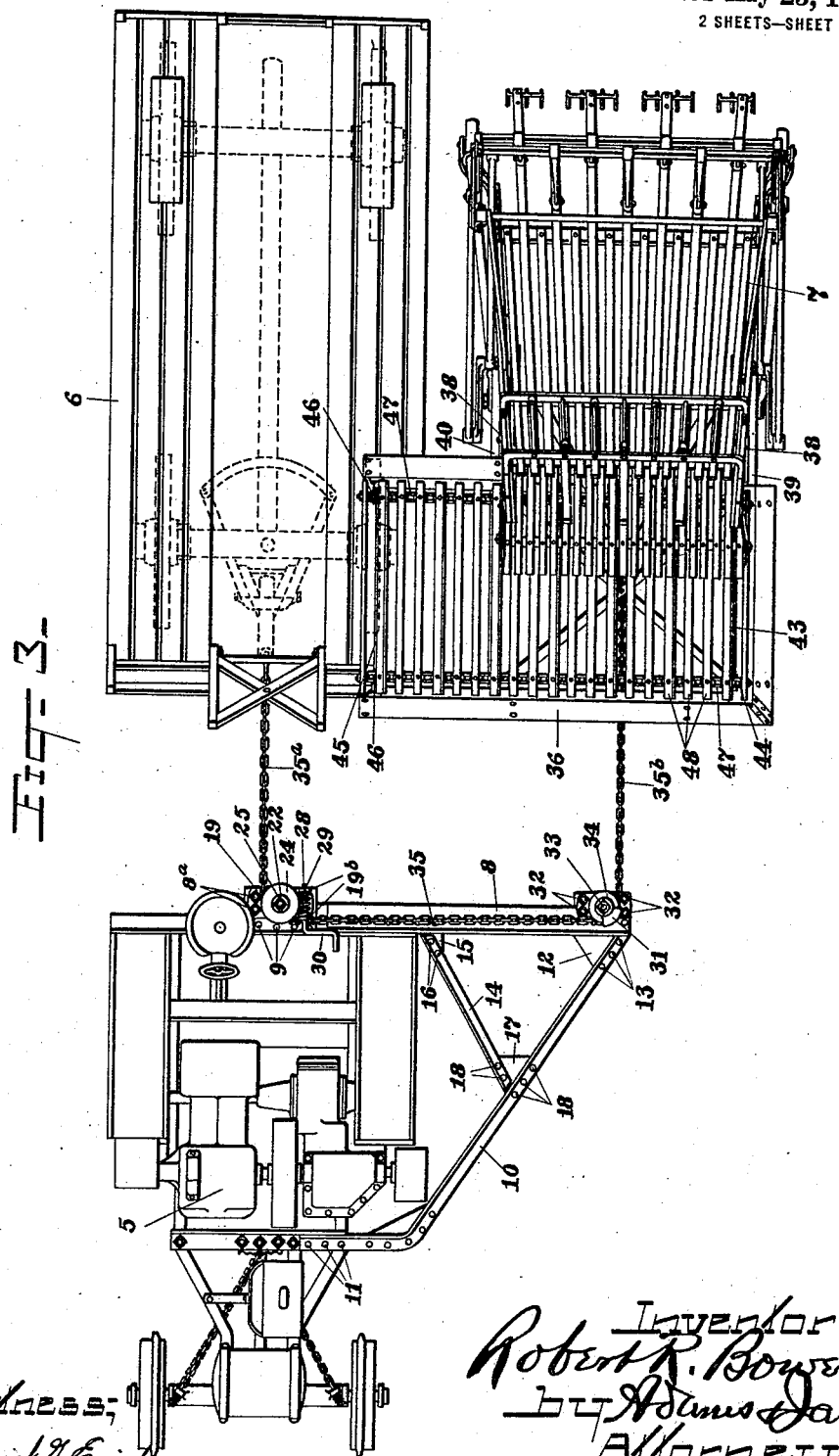

UNITED STATES PATENT OFFICE.

ROBERT R. BOWERS, OF OTTUMWA, IOWA, ASSIGNOR TO DAIN MANUFACTURING CO. OF IOWA, OF OTTUMWA, IOWA, A CORPORATION OF IOWA.

DRAFT ATTACHMENT.

1,416,681.          Specification of Letters Patent.     Patented May 23, 1922.

Application filed September 27, 1920. Serial No. 413,088.

*To all whom it may concern:*

Be it known that I, ROBERT R. BOWERS, a citizen of the United States, residing at Ottumwa, in the county of Wapello and State of Iowa, have invented certain new and useful Improvements in Draft Attachments, of which the following is a specification, reference being had therein to the accompanying drawing.

This invention relates to draft attachments for agricultural implements and is especially adapted to be used with tractors and the object of the invention is to provide a draft attachment whereby several devices may be simultaneously drawn side by side by the tractor and the relative fore and aft position of the devices changed easily and quickly.

Referring to the drawings in which like numerals indicate identical parts.

Figure 1 is a side view of the draft attachment, connected to a tractor and with a hay loader and a wagon attached.

Figure 2 is a view on line $a-a$ of Figure 1.

Figure 3 is a plan view of Figure 1.

5 represents in general a tractor that may be of any preferred type and construction. 6 is a hay wagon of ordinary construction equipped with a stub tongue. 7 is a hay loader of a well known type. 8 is a bar, in this instance made from angle iron, attached at one end to the rear portion of the tractor 5 by means of bolts or rivets 9. The opposite end of the bar 8 projects beyond the side of the tractor 5 and is supported by means of a brace 10 which is attached to the tractor by means of rivets 11 and to the bar by a gusset plate 12 and rivets 13. The bar 8 is further supported and strengthened by means of a brace 14 which is attached at one end to the bar 8 by means of a gusset plate 15 and rivets 16 and to the brace 10 by a gusset plate 17 and rivets 18.

19 is a casting attached to the bar 8 near its inner end by means of bolts $8^a$. The casting 19 carries a vertical shaft 20, the ends of which are squared and tapered as indicated at 21 in Figure 2. The ends of the shaft 20 are also threaded to receive nuts 22 and 23. 24 is a worm gear mounted on the upper end of the shaft 20 and is held in place by means of a washer 25 and the nut 22. On the lower taper of the shaft 20, a pocket wheel or block 26 is mounted and is held in place by a washer 27 and the nut 23. Integral with the casting 19 is an arm $19^a$ and spaced lugs $19^b$ which form suitable supports for bearings for a shaft 28, which, except where it passes through said bearings, is preferably square in cross-section as shown. The shaft may be square throughout its length, of course, and have fitted or formed thereon annular collars or bands that rest in the bearings—all as is well understood. Mounted on the squared portion of the shaft 28 between the lugs $19^b$, and properly meshing with the worm gear 24 is a worm 29. The shaft 28 is also bent to form a crank as indicated at 30. The worm 29 and the worm gear 24 are of the non-coasting type so there can be no rotary movement of the shaft 20 in its bearings and consequently no movement of the pocket wheel 26 until the worm 29 is turned by means of the crank 30.

A casting 31 is attached to the outer end of the bar 8 by bolts 32, and carries a vertical shaft 33 upon which is mounted an idler pocket wheel 34.

The devices to be drawn are preferably connected to the draft attachment by means of a block chain 35. Intermediate its ends the chain 35 engages the idler pocket wheel 34 and the pocket wheel 26. One end portion $35^a$ of the chain is connected to the stub tongue of the wagon 6 and the other end portion $35^b$ to the tongue of the loader 7.

In order that the hay gathered and elevated by the loader 7 may be placed on the wagon 6, a cross conveyor 36 is attached to the loader, directly under the point of delivery of the hay, by means of bars 37, 38, 39 and 40. The conveyor is driven by power from the loader through the shaft 41, the universal joint 42, and the transverse shaft 43, to which latter shaft are fixed sprockets 44. At the outer end of the conveyor or carrier, is mounted in suitable bearings, a shaft 45 to which are fixed sprockets 46. 47 are endless chains which operate around the sprockets 44 and 46. The chains 47 carry spaced slats or bars 48 which, when operated by power from the loader through the above described connections, convey the hay from the loader 7 to the wagon 6.

The operation of the draft attachment is as follows:—When the wagon and loader are in the side by side position illustrated in Figure 3, they remain in the same relative fore and aft position as the tractor progresses over the ground until sufficient hay has been gathered by the loader and deposited on the wagon by the conveyor 36 to fill the portion of the wagon rack opposite the conveyor. The operator then turns the crank 30 to the right which will operate the pocket wheel 26 and shorten the end 35$^a$ and lengthen the end 35$^b$ of the chain 35 and cause the wagon 6 to be brought closer to the tractor and the loader 7 to drop back and the hay being delivered to the wagon from the conveyor 36 will be deposited at an unfilled portion of the wagon rack. This operation is continued until the wagon is completely loaded when the conveyor 36 will be opposite the rear of the wagon 6.

It will be evident that the operator may change the relative fore and aft position of the wagon and hay loader to the extent and at the speed desired and by reversing the direction in which he turns the crank 30 bring either the wagon or the hay loader forward and let the other drop back as may be desired.

It is to be understood however, that devices other than a wagon and loader may be used with the draft attachment, as these have been shown only to illustrate the operation of the invention.

What I claim is—

1. In a draft attachment for tractors, the combination of means for connecting to the tractor a plurality of devices side by side, said means comprising a flexible connection whose intermediate portion extends transversely of the tractor and whose end portions are attachable to said devices, and means operable to vary the relative fore and aft position of the devices by shifting said connection.

2. In a draft attachment for tractors, the combination of flexible means for connecting a plurality of devices to the tractor and means supported by the tractor, under control of the operator, to vary the fore and aft position of the devices.

3. In a draft attachment for tractors, the combination of a continuous flexible member for connecting a plurality of devices to the tractor and means supported by the tractor for engaging and moving said flexible member to vary the fore and aft position of the said devices.

4. In a draft attachment for tractors, the combination of means for connecting a plurality of devices to the tractor, spacing means connected with and projecting laterally from the tractor and supporting the connecting means, and means engaging the connecting means operable to vary the fore and aft position of the devices.

5. In a draft attachment for tractors, the combination of means for flexibly connecting a plurality of devices to the tractor and rotatable means engaging the said connecting means operable to vary the fore and aft position of the devices.

6. In a draft attachment for tractors, the combination of a transverse bar connected to the tractor, a single flexible member connecting a plurality of devices to the transverse bar and means mounted on the said transverse bar operable to vary the fore and aft position of the devices.

7. In a draft attachment for tractors, the combination of a transverse bar connected to the tractor, means flexibly connecting a plurality of devices to the tractor and having contact with the said transverse bar and means supported by the tractor engaging the connecting means operable to vary the fore and aft position of the devices.

8. The combination with a tractor and means for connecting therewith two trailing devices movable along parallel paths, said means comprising a flexible member adapted to have end portions thereof attached to such trailing devices, respectively, and means supported by the tractor for engaging and moving said flexible member to effect a change in the positions of such trailing devices relative to each other and to the tractor.

9. The combination with a tractor and means for connecting therewith two trailing devices movable along parallel paths, said means comprising a flexible member adapted to have said portions thereof attached to such trailing devices, respectively, and rotatable means supported by the tractor for engaging an intermediate portion of said flexible member and causing a bodily movement thereof to effect a change in the positions of such trailing devices relative to each other and to the tractor.

10. The combination with a tractor and means for connecting therewith two trailing devices movable along parallel paths, said means comprising a flexible connection having an intermediate portion supported transversely of the tractor to permit the attachment of its end portions to such trailing devices, and means supported by the tractor for compelling a bodily lengthwise movement of the said connection for changing the positions of such trailing devices relative to each other and to the tractor.

11. The combination with a tractor and means for connecting therewith two trailing devices movable along parallel paths, said means comprising a flexible connection, means for supporting at the rear of the tractor an intermediate portion of such connection transversely of the tractor, a portion of the length of such intermediate portion projecting beyond one side of the tractor, and means supported by the tractor for compelling a bodily lengthwise movement of the said connection to shorten one of the end portions of the said connection and lengthen the other end portion to cause a change in the relative positions of the trailing devices with which said end portions connect.

12. The combination with a tractor and means for connecting therewith two trailing devices movable along parallel paths, said means comprising a flexible connection, a plurality of rotatable devices for supporting at the rear of the tractor an intermediate portion of such connection transversely of the tractor, and means supported by the tractor for engaging one of said supporting devices to rotate it and compel a bodily lengthwise movement of the said connection so as to cause a change in the relative positions of the trailing devices with which said end portions connect.

13. The combination with a tractor, of a draft attachment therefor comprising a transversely-arranged rigid bar connected to the rear end of the tractor and projecting beyond one side of the tractor, two guiding members connected with said bar, a flexible connection passing around said guiding members for attachment of two trailers to the end portions of said connection, and means supported by the tractor for causing a movement of the flexible connection to change the positions of such trailers relative to each other and to the tractor.

14. The combination with a tractor, of a draft attachment therefor comprising a transversely-arranged rigid bar connected with the rear end of the tractor and projecting beyond one side of the tractor, a guiding member supported adjacent to the outer end of the projecting portion of said bar, a second guiding member supported in rear of the tractor between the planes of the tractor's wheels, a flexible connection passing around said guiding members for attachment to the ends of said connection of two trailers, and means supported by the tractor for causing a movement of the flexible connection for changing the positions of such trailers relative to each other and to the tractor.

15. The combination with a tractor, of a draft attachment therefor for connecting two trailers to the tractor, said draft attachment comprising a flexible connection, two guiding devices placed a distance apart and supported from the tractor and maintaining an intermediate portion of said connection transversely of the tractor, a gear member connected with one of said guiding devices, and means for rotating said gear to compel a bodily lengthwise movement of said connection for changing the relative positions of such trailers to each other and to the tractor.

16. The combination with a tractor, of a draft attachment therefor for connecting two trailers to the tractor, said draft attachment comprising a flexible connection, two guiding devices placed a distance apart and supported from the tractor and maintaining an intermediate portion of said connection transversely of the tractor, a gear member connected with one of said guiding devices, means for rotating said gear to compel a bodily lengthwise movement of said connection for changing the relative positions of such trailers to each other and to the tractor, said rotating means also serving to lock said gear against rotation from any position to which it has been turned.

ROBERT R. BOWERS.